(12) United States Patent
Asayama

(10) Patent No.: US 6,490,178 B1
(45) Date of Patent: Dec. 3, 2002

(54) SWITCHING POWER CIRCUIT WHICH SWITCHES VOLTAGE SUPPLIED TO A PRIMARY WINDING OF A TRANSFORMER WITH A SWITCHING ELEMENT TO RECTIFY ALTERNATING CURRENT GENERATED IN A SECONDARY WINDING OF THE TRANSFORMER

(75) Inventor: Atsushi Asayama, Ohta-ku (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 09/547,564

(22) Filed: Apr. 12, 2000

(30) Foreign Application Priority Data

Apr. 20, 1999 (JP) .............................. 11-111980

(51) Int. Cl.[7] .............................. H02M 3/335
(52) U.S. Cl. .................. 363/21.06; 363/91; 363/93
(58) Field of Search .................. 363/21, 91, 90, 363/82, 124, 130, 21.06, 127, 21.08, 93

(56) References Cited

U.S. PATENT DOCUMENTS

| | | | | |
|---|---|---|---|---|
| 4,451,876 A | * | 5/1984 | Ogata | 363/21 |
| 4,642,743 A | * | 2/1987 | Radcliffe | 363/21 |
| 5,424,932 A | * | 6/1995 | Inou et al. | 363/127 |
| 5,528,480 A | * | 6/1996 | Kikinis et al. | 363/127 |
| 5,612,862 A | * | 3/1997 | Marusik et al. | 363/93 |
| 5,940,287 A | * | 8/1999 | Brkovic | 363/127 |
| 6,055,170 A | * | 4/2000 | Yee | 363/127 |
| 6,069,802 A | * | 5/2000 | Priegnitz | 363/97 |

* cited by examiner

Primary Examiner—Jeffrey Sterrett
Assistant Examiner—Gary L. Laxton
(74) Attorney, Agent, or Firm—Rossi & Associates

(57) ABSTRACT

In a switching power circuit, one end of a primary winding of a transformer having a plurality of windings is connected to a voltage source, and the other end is connected to a return side of the voltage source through a first switching device. At least one of secondary windings of the transformer is connected to a forward-type rectifier circuit, which is comprised of a rectifier diode, a flywheel diode, a choke coil, and a smoothing condenser, through a MAGAMP. A second switching device is connected in parallel with the flywheel diode, and the second switching device is turned on/off according to an output of the secondary winding of the transformer or according to a signal acquired by inverting the secondary winding output.

14 Claims, 7 Drawing Sheets

SWITCHING POWER CIRCUIT WHICH SWITCHES VOLTAGE SUPPLIED TO A PRIMARY WINDING OF A TRANSFORMER WITH A SWITCHING ELEMENT TO RECTIFY ALTERNATING CURRENT GENERATED IN A SECONDARY WINDING OF THE TRANSFORMER

BACKGROUND OF THE INVENTION

1. Field of the Invention

This invention relates to a switching power circuit.

2. Description of Related Art

FIG. 5 is a block diagram showing a switching power circuit having a conventional MAGAMP magnetic amplifier system regulator. In FIG. 5, symbol T1 denotes a switching power supply transformer, which is comprised of a primary winding N11, secondary windings N21, N22, and a primary auxiliary winding N12 supplying power to a primary control circuit. A commercial power supply Vin (AC) is rectified by a diode bridge DB1, and is smoothed by a smoothing condenser C1 to thereby acquire a direct current voltage Vin (DC). A field effect transistor (FET) Q1 performs high-frequency switching of the direct current voltage Vin (DC) charged in the condenser C1, and the direct current voltage Vin is applied to the primary winding N11 of the transformer T1. A pulse voltage synchronous with an output of the primary winding N11 is generated at the secondary winding N21 of the transformer T1. A rectifier circuit formed of diodes D11, D12, a choke coil L11 and a condenser C11 rectifies and smoothes the pulse voltage to thereby acquire a direct current voltage Vo1.

Resistances R11, R12, R13, a Zener diode Q3, a photo coupler Q2 and the primary control circuit detect and feedback-control the direct current voltage Vo1 by controlling the on/off time ratio for switching the field effect transistor Q1 in such a manner that the direct current voltage Vo1 can be a desired value. At the second winding N22, a saturable reactor L22, a transistor Q22, a Zener diode Q21, resistances R21, R22, R23, R24, R25 and a diode D23 control a direct current voltage Vo2 to a desired voltage by a MAGAMP (Magnetic Amplifier) system. A forward-type rectifier circuit is comprised of a rectifier diode D21, a flywheel diode D22, a choke coil L21 and a smoothing condenser C21.

The MAGAMP system is based upon a magnetic saturation operation of the saturable reactor. The saturable reactor is a device which has a sufficient initial inductance and is magnetically saturated to have an inductance L≈0 when an integrated value of a certain voltage * a time (which is generally called the "ET integrated value") is applied to the saturable reactor. In FIG. 5, symbol L22 denotes the saturable reactor. FIG. 6 is a waveform chart showing waveforms at points A and B in the switching power circuit in FIG. 5. As shown in FIG. 6, when a voltage V1 is generated at the point A at a time T0, the impedance of the saturable reactor L22 is high until a predetermined time Ti, so that no voltage is generated at the point B. When the ET integrated value (V1 * (T1−T0)) reaches a saturation ET integrated value of the saturable reactor L22 at the time T1, the impedance of the saturable reactor L22 is decreased to such a low value that the voltage at the point A passes through the point B. A reset current Ir is carried through the saturable reactor L22 through the transistor Q22 between times T2 and T3, so that the saturable reactor L22 is reset or released from its saturated state. Thereafter, the same process (the high impedance, the decrease in impedance, and the reset) is repeated from the time T3.

The saturation ET integrated value of the saturable reactor L22 can be controlled by controlling the reset current Ir. Specifically, the resistances R21, R22 detect the output voltage Vo2, and the reset current Ir corresponding to a difference of the detected output voltage Vo2 from a reference voltage is carried through the saturable reactor L22, thus stabilizing the output voltage Vo2 at a desired voltage. This is called the MAGAMP system regulator.

A synchronous rectifying system may be used instead of the MAGAMP system. A description will now be given of a synchronous rectifier circuit with reference to FIG. 7. FIG. 7 is a block diagram showing a switching power circuit provided with a synchronous rectifying system regulator. Field effect transistors (FET) Q20, Q21 as semiconductor switching devices are connected in parallel with secondary rectifier diodes D21, D22, respectively. The field effect transistor Q20 is turned on only while the diode D21 is conducted. The field effect transistor Q21 is turned on only while the diode D22 is conducted. Consequently, a current is carried through the field effect transistors Q20, Q21 with low ON resistance, and the current is rectified by a drop in voltage by a forward voltage Vf (≈0.5V) of the diodes D21, D22 or less.

Since a certain limited time is required for turning on/off the field effect transistors Q20, Q21, there is a time-lag when drive signals for the field effect transistors Q20, Q21 are acquired from a drive signal for the primary field effect transistor Q1 in synchronism therewith. To address this problem, a PWM control circuit detects the output voltage Vo1 regarded as a reference oscillation signal S0, and a signal S1 with a time lag from the reference oscillation signal S0 drives the field effect transistor Q1. A signal S2 with a smaller time lag than the signal S1 drives the synchronous rectifier field effect transistors Q20, Q21. This is called the synchronous rectifying system.

Thus, the synchronous rectifying system requires a complicated synchronous signal circuit. Further,. an additional circuit is needed for acquiring the drive signal for the primary switching device (field effect transistor Q1). Therefore, the synchronous rectifying system is not suitable for a method wherein a control IC is arranged at an upstream side (see FIG. 5), which is now the mainstream.

In recent years, the operating voltage of digital ICs has been lowered, and the direct current voltage Vo2 of the above-mentioned switching power circuit is set to 3.3V in many cases. In such cases, a power loss (=Vf * Io) due to the forward voltage Vf (≈0.5V) of the diodes D21, D22 is relatively larger than in the case where the voltage Vo2 is 5V. This deteriorates the power conversion efficiency.

SUMMARY OF THE INVENTION

It is therefore an object of the present invention to solve the above-mentioned technical problems.

It is another object of the present invention to provide a switching power circuit, which has improved power conversion efficiency with a simple structure and low costs.

To accomplish the above objects, according to a first aspect of the present invention, there is provided a switching power circuit comprising a transformer having a plurality of windings, one end of a primary winding of the transformer being connected to a voltage source, a first switching device, another end of the primary winding being connected to a return side of the voltage source through the first switching device, a magnetic amplifier connected to the secondary winding of the transformer, a forward-type rectifier circuit connected to the magnetic amplifier and including at least a flywheel diode, a second switching device connected in parallel with the flywheel diode, and a control circuit for turning on/off the second switching device according to an output of the secondary winding of the transformer or according to a signal acquired by inverting the output of the secondary winding.

To accomplish the above objects, according to a second aspect of the present invention, there is provided a switching power circuit comprising a transformer having a plurality of windings, one end of a primary winding of the transformer being connected to a voltage source, a first switching device, another end of the primary winding being connected to a return side of the voltage source through the first switching device, a semiconductor switching device connected to the secondary winding of the transformer, a forward-type rectifier circuit connected to the semiconductor switching device and including at least a flywheel diode, a second switching device connected in parallel with the flywheel diode, and a control circuit for turning on/off the second switching device according to an output of the secondary winding of the transformer or according to a signal acquired by inverting the output of the secondary winding.

Preferably, the switching power circuit according to the second aspect further comprises a synchronous chopper control circuit for turning on/off the semiconductor switching device according to an output of the forward-type rectifier circuit.

To accomplish the above objects, according to a third aspect of the present invention, there is provided a switching power circuit comprising a transformer having a plurality of windings, one end of a primary winding of the transformer being connected to a voltage source, a first switching device, another end of the primary winding being connected to a return side of the voltage source through the first switching device, a conducting/cutting-off circuit connected to the secondary winding of the transformer, for conducting and cutting-off an input signal, a forward-type rectifier circuit connected to the conducting/cutting-off circuit and including at least a flywheel diode, a second switching device connected in parallel with the flywheel diode, and a control circuit for outputting a control signal for controlling conducting or cutting-off timing of the conducting/cutting-off circuit according to an output of the forward-type rectifier circuit, and wherein the second switching device is controlled in such a manner as to be off during a predetermined period included in a cutoff period of the conducting/cutting-off circuit.

Preferably, the conducting/cutting-off circuit comprises a saturable reactor, and the control circuit comprises a reset current control circuit for controlling a reset current for resetting the saturable reactor.

Alternatively, the conducting/cutting-off circuit comprises a semiconductor switching device, and the control circuit comprises a synchronous chopper control circuit for turning on/off the semiconductor switching device.

In a preferred form of each aspect, the forward-type rectifier circuit further comprises a rectifier diode, a choke coil, and a smoothing condenser.

In a preferred form of each aspect, the transformer further comprises a second secondary winding, the switching power circuit further comprising a second forward-type rectifier circuit connected to the second secondary winding.

In a preferred form of each aspect, the switching power circuit further comprises a second control circuit for turning on/off the first switching device according to an output of the second forward-type rectifier circuit.

According to the switching power circuit of the present invention, to obtain a power supply output using the MAG-AMP or the semiconductor switching device connected to the secondary side of the transformer of the switching power source, a primary switching signal is acquired from the output of the secondary winding. The second switching device (rectifier field effect transistor at the flywheel side) is driven according to a drive signal acquired from the primary switching signal or by inverting the primary switching signal. This realizes a switching power circuit having a regulator of a relatively-low voltage which has improved power conversion efficiency with a simple structure and at low costs.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

This invention will be described in further detail by way of example with reference to the accompanying drawings.
(First Embodiment)

According to a first embodiment of the present invention, a switching power circuit, which has a voltage regulating circuit using a MAGAMP connected to at least one winding of secondary windings of a switching power supply transformer, is characterized by constructing a synchronous rectifier circuit by replacing the rectifier diode at the flywheel side of the output of the secondary winding having the MAGAMP connected thereto by a field effect transistor (FET), obtaining a primary switching signal of the switching power supply transformer from the secondary winding, and driving the rectifying field-effect transistor (at the flywheel side) of the synchronous rectifier circuit according to a drive signal acquired by inverting the primary switching signal.

Figure 1:
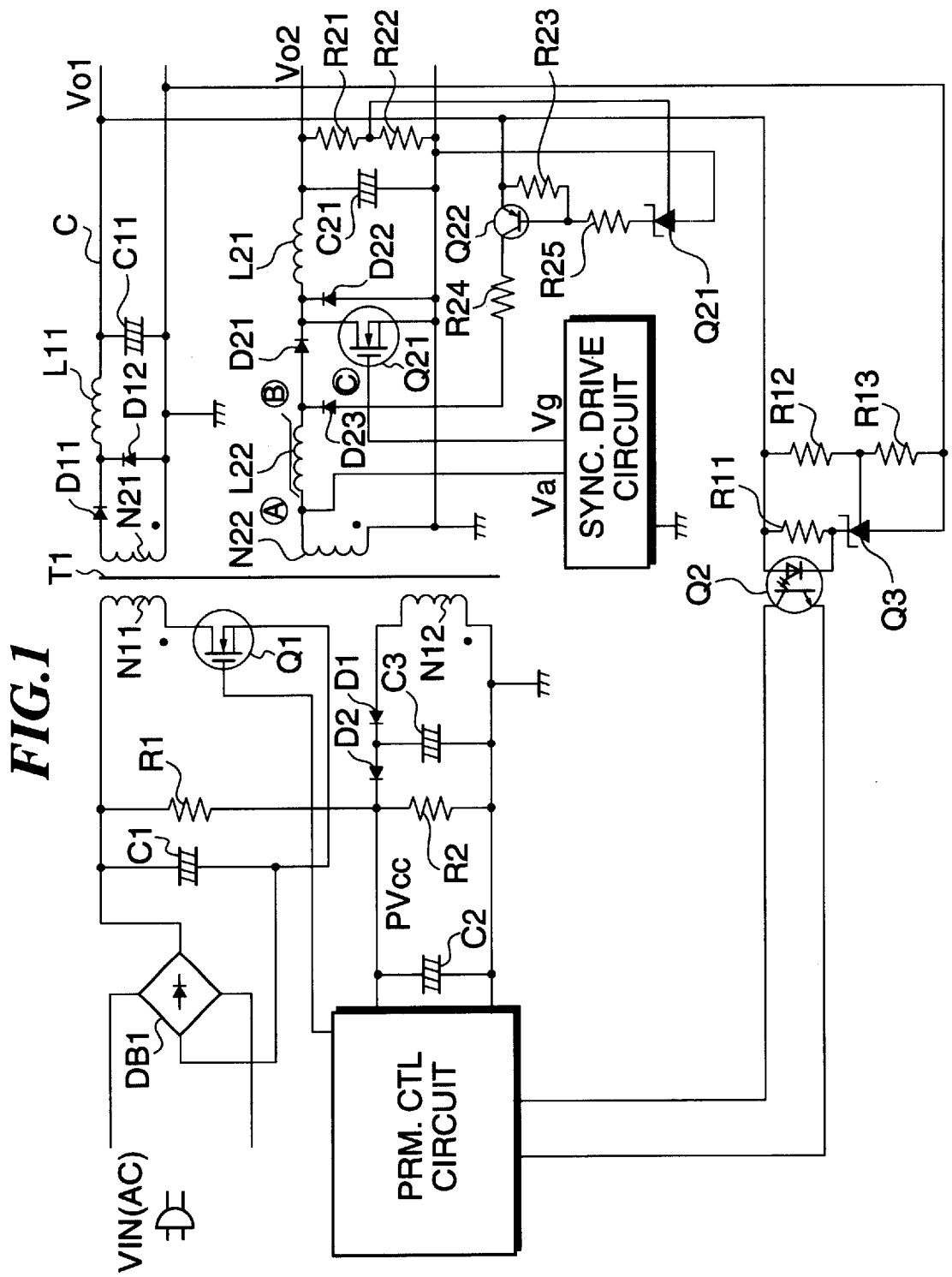
FIG. 1 is a block diagram showing the construction of a switching power circuit according to a first embodiment of the present invention.
Figure 5:
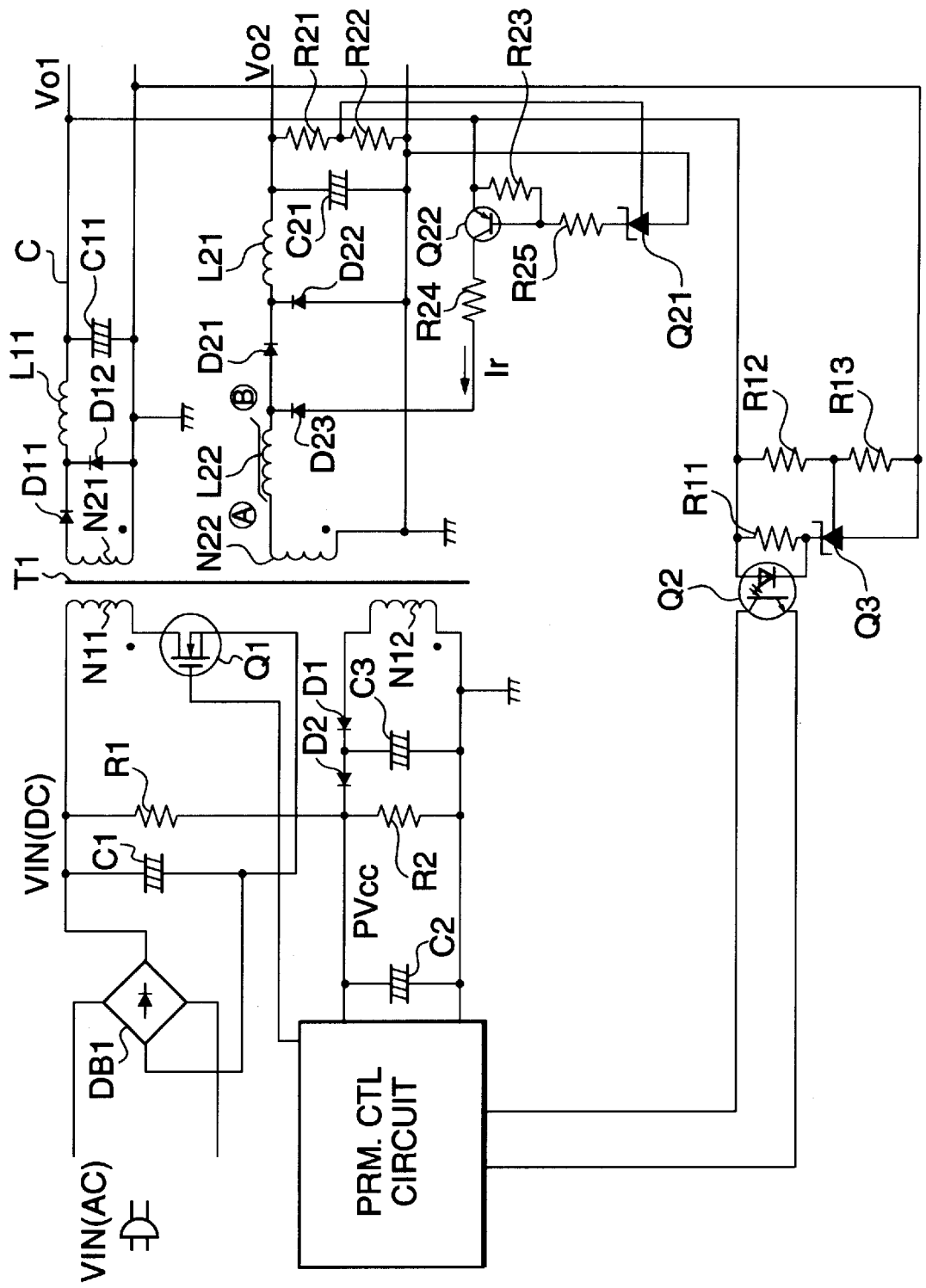
FIG. 5 is a block diagram showing the construction of a switching power circuit provided with a conventional MAG-AMP system regulator.
Figure 6:
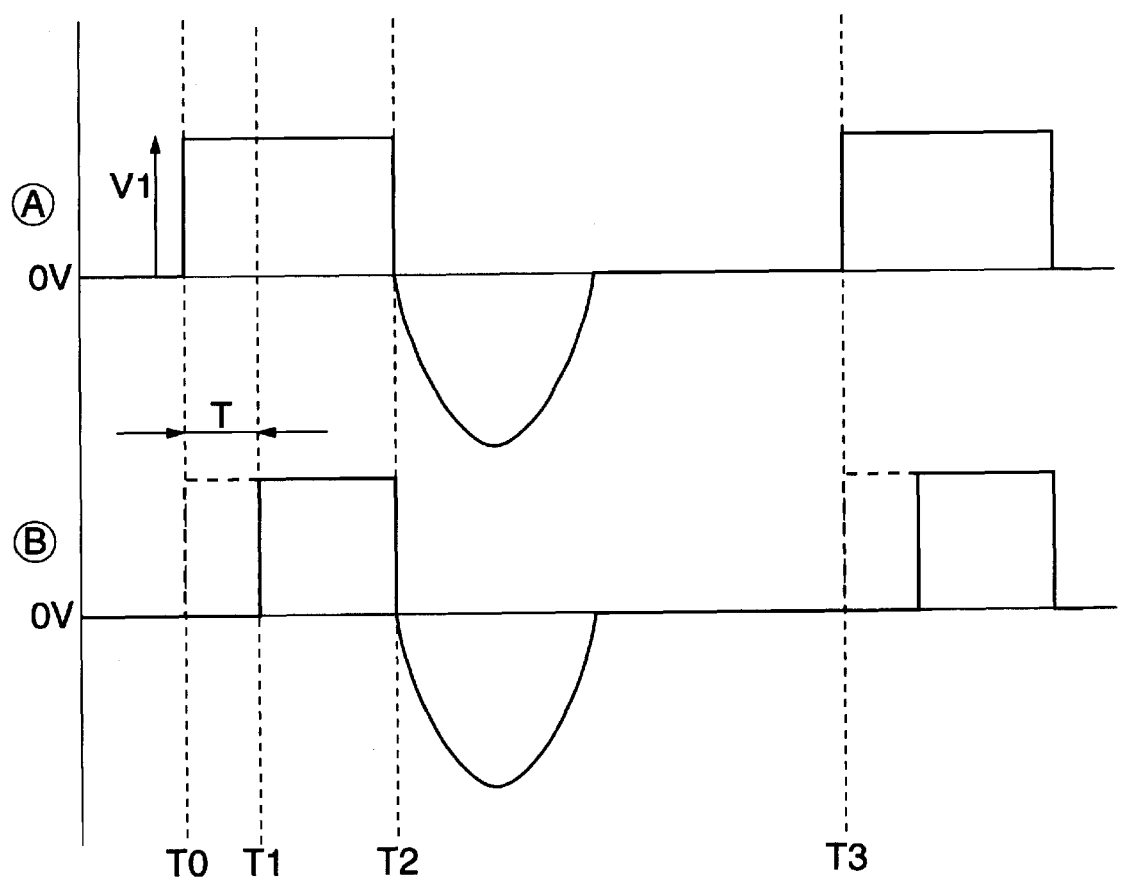
FIG. 6 is a waveform chart showing waveforms at points A and B in the switching power circuit in FIG. 5.
Figure 7:
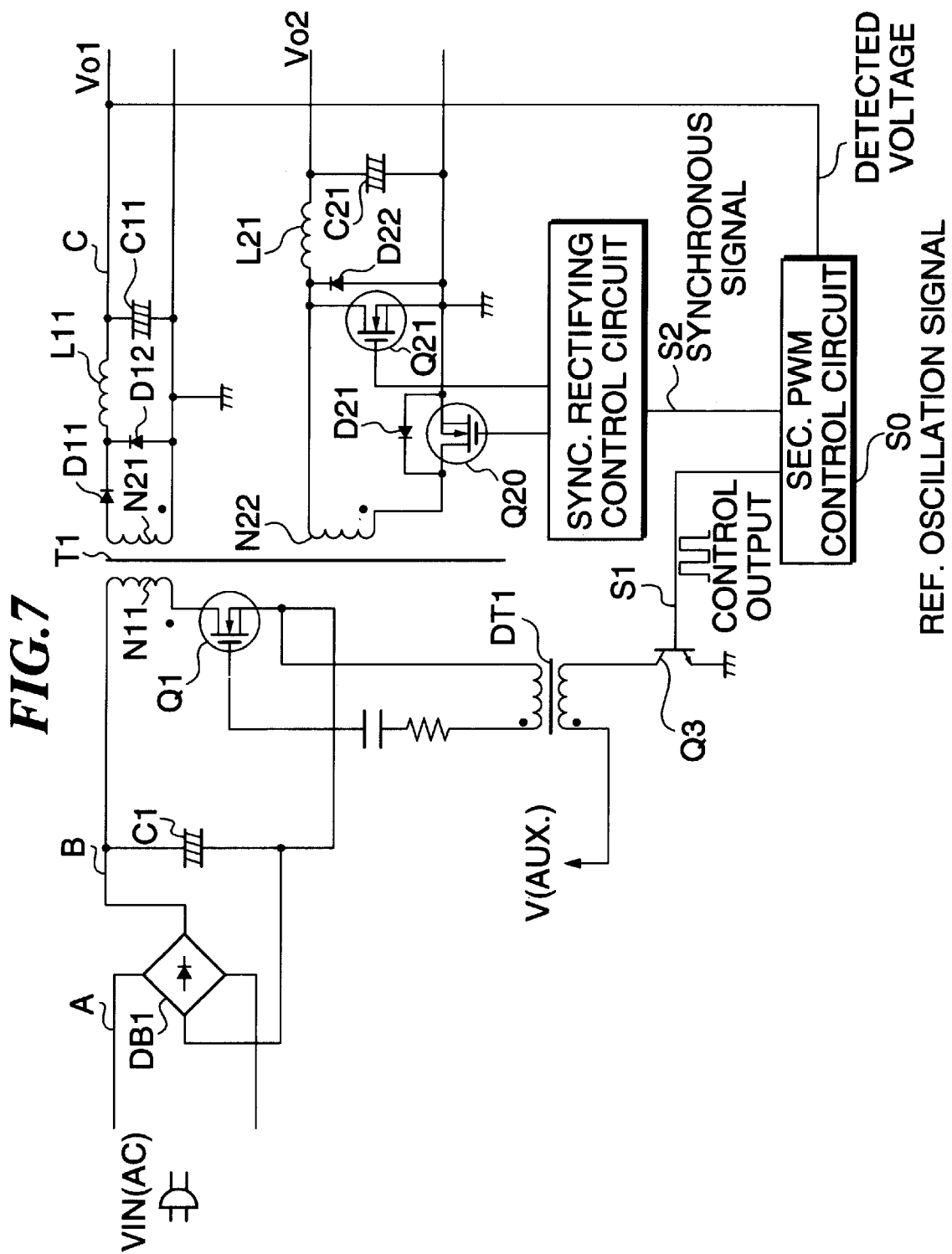
FIG. 7 is a block diagram showing the construction of a switching power circuit provided with a synchronous detection system regulator.

FIG. 1 is a block diagram showing the construction of the switching power circuit according to the first embodiment. The switching power circuit in FIG. 1 is different from the switching power circuit in FIG. 5 in that a field effect transistor (FET) Q21 is connected in parallel with a flywheel diode D22 connected to a secondary winding N22 of a transformer T1, and that a synchronous drive circuit is added for acquiring a drive signal Vg for driving the field effect transistor Q21 by inverting a voltage Va at a junction A between the secondary winding N22 and a saturable reactor L22. Except this, the switching power circuit in FIG. 1 is constructed similarly to the switching power circuit in FIG. 5, and a further description is omitted.

Figure 2:
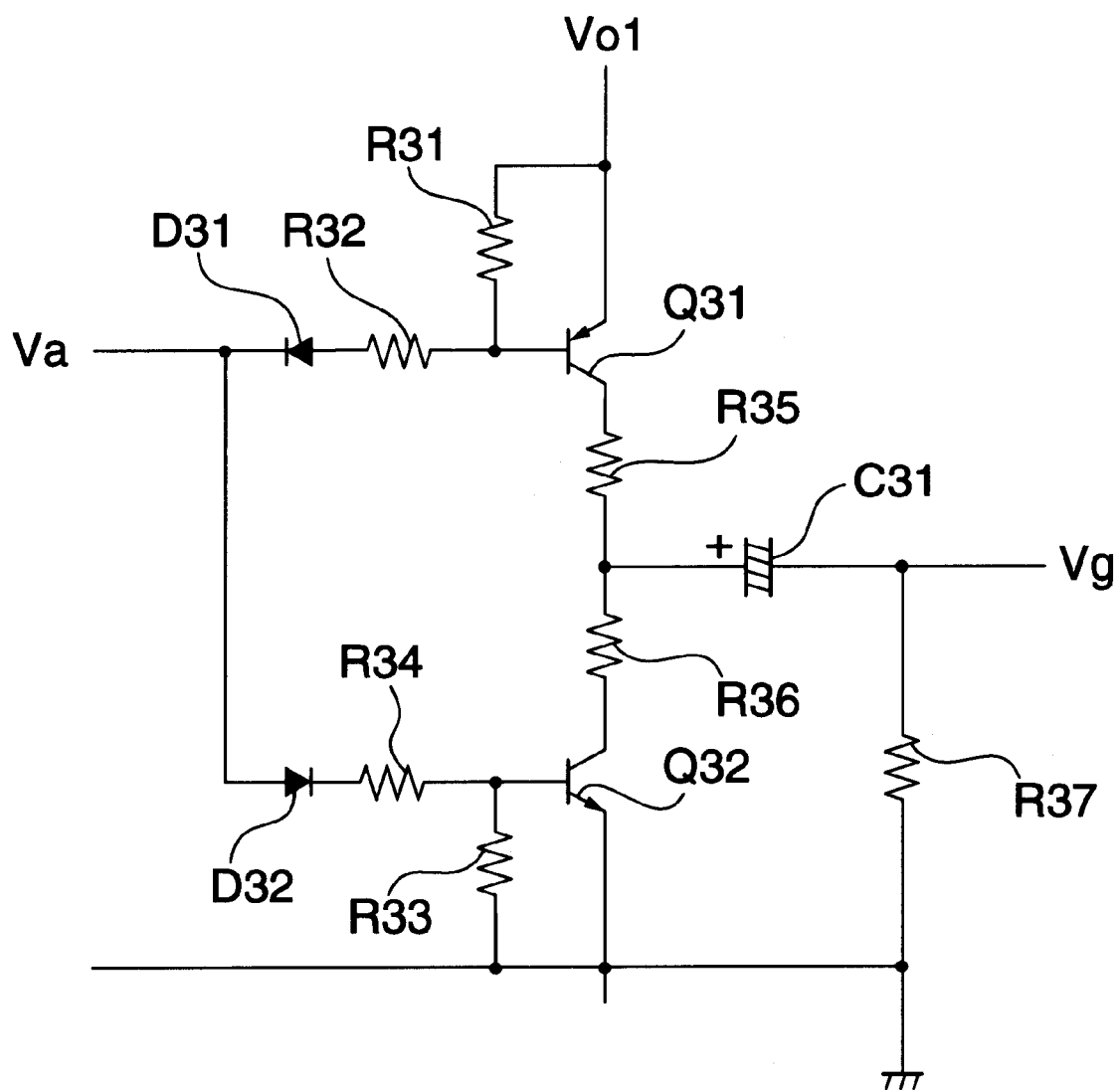
FIG. 2 is a block diagram showing the construction of a synchronous drive circuit.

Referring next to FIG. 2, there will now be explained the concrete structure of the synchronous drive circuit. FIG. 2 is a block diagram showing the construction of the synchronous drive circuit in FIG. 1.

In the synchronous drive circuit, when a drive signal (a pulse voltage generated at the point A) Va is a negative voltage, a transistor Q31 is turned on and a transistor Q32 is turned on to charge a condenser C31, thus generating a positive drive voltage Vg. When the drive signal Va is a positive voltage, the transistor Q31 is turned off and the transistor Q32 is turned on to discharge the condenser C31, thus generating a negative drive voltage Vg.

Figure 3:
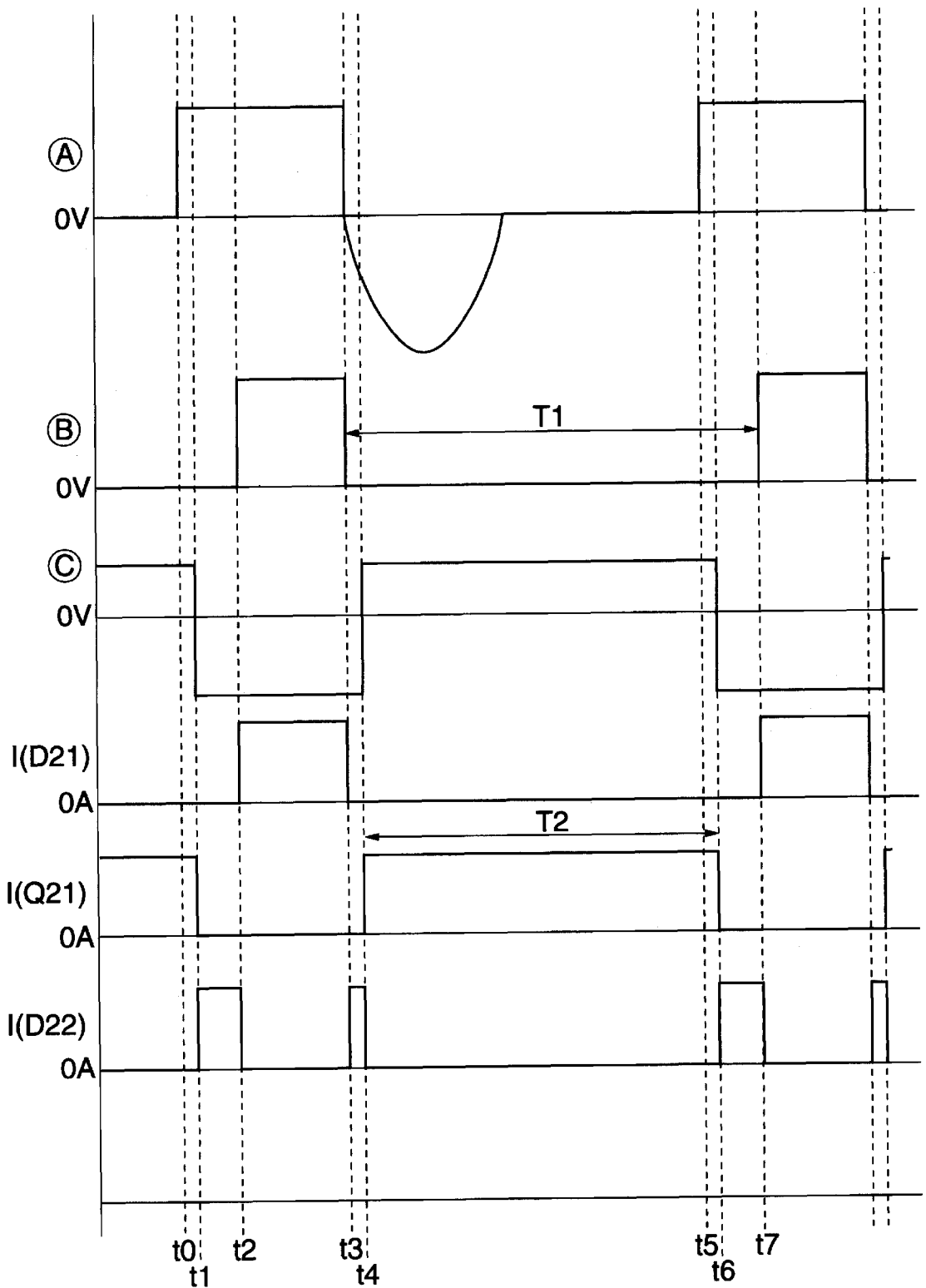
FIG. 3 is a view showing waveforms at various points in the switching power circuit in FIG. 1.

Referring next to FIG. 3 as well as FIG. 1, there will now be explained the operation of the circuit. FIG. 3 shows waveforms at various portions of the switching power circuit in FIG. 1.

At a time t0, a voltage is generated at the point A as shown in FIG. 3. At this time, the transistor Q32 in FIG. 2 is turned on to turn a gate voltage of the field effect transistor Q21 at a point C into a negative voltage, so that the field effect transistor Q21 is turned off. Due to the delay of the circuit, the field effect transistor Q21 is turned off at a time t1 slightly delayed from the time t0. At a time t2, the saturable reactor L22 as the MAGAMP is magnetically saturated to decrease the impedance thereof to a low value, and accordingly a voltage is generated at a point B so that a current flows through a diode D21. At this time, the field effect transistor Q21 is off, and thus, a short-circuit current of the secondary winding N22 never flows through the field effect transistor Q21.

At a time t3, the voltage (at the point A) from the secondary winding N22 drops, and thus, the diode D21 is turned off. Then, a flywheel current starts flowing in the diode D22 due to a flywheel effect of a choke coil L21. On the other hand, the transistor Q31 in FIG. 2 is turned on at the time t3, and thus, the gate voltage of the field effect transistor Q21 at the point C is raised to a positive voltage to turn the field effect transistor Q21 on. Due to the delay of the circuit, the field effect transistor Q21 is turned on at a time t4. Then, the current having flowed through the diode D22 is bypassed by the field effect transistor Q21 to turn the diode D22 off. In this connection, the field effect transistor Q21 is selected so that a voltage drop resulting from the ON resistance of the field effect transistor Q21 is smaller than the forward voltage Vf of the diode D22.

When a voltage is generated again at the point A at a time t5, the field effect transistor Q31 in FIG. 2 is turned off, and the transistor Q32 is turned on. Therefore, the gate voltage of the field effect transistor Q21 at the point C is turned into a negative voltage to turn the field effect transistor Q21 off. Due to the delay of the circuit, the field effect transistor Q21 is turned off at a time t6 slightly delayed from the time t5. Then, the diode D22 is turned on, so that the current flows through the diode D22 until a time t7 when the saturable reactor L22 becomes magnetically saturated. Consequently, the diode D21 is off during a period T1 between the times t3 and t7. Thereafter, the above sequence of actions is repeated.

The diode D22 is bypassed by the field effect transistor Z21 during a period T2 between the time t4 to the time t6, and equivalently, the forward voltage of the diode D22 is low during the period T2. Therefore, the power loss is reduced during the period T2 between the time t4 and the time t6. The period T2 is included in the period T1.

Generally, a switching power supply of this type stores a sufficient amount of energy in the condenser C1 so as to work even when a commercial power supply is instantly interrupted, and the ON time ratio of the field effect transistor Q1 is set at about 20–25%. Since a period between the time t3 and the time t5 covers 75–80% of the whole processing time, the equivalent decrease in the forward voltage Vf of the diode D22 during this period substantially reduces the power loss. Thus, the switching power circuit according to this embodiment, which has the voltage regulating circuit using the saturable reactor L22 as the MAGAMP connected to at least one of the secondary windings N21, N22 of the switching power supply transformer, is characterized by constructing the synchronous rectifier circuit by replacing the rectifier diode D22 at the flywheel side of the output of the secondary winding N22 having the saturable reactor L22 as the MAGAMP by the field effect transistor Q21, obtaining the primary switching signal of the switching power supply transformer T2 from the secondary winding N22, and driving the rectifying field-effect transistor Q21 (at the flywheel side) of the synchronous rectifier circuit according to the drive signal Vg acquired by inverting the switching signal.

(Second Embodiment)

According to a second embodiment of the present invention, a switching power circuit, which has a voltage regulating circuit using a synchronous chopper circuit connected to at least one winding of secondary windings of a switching power supply transformer, is characterized by constructing a synchronous rectifier circuit by replacing the rectifier diode at the flywheel side of the output of the secondary winding having the synchronous chopper circuit by a field effect transistor (FET), obtaining a primary switching signal of the switching power supply transformer from the secondary winding, and driving the rectifying field-effect transistor (at the flywheel side) of the synchronous rectifier circuit according to a drive signal acquired by inverting the switching signal.

Figure 4:
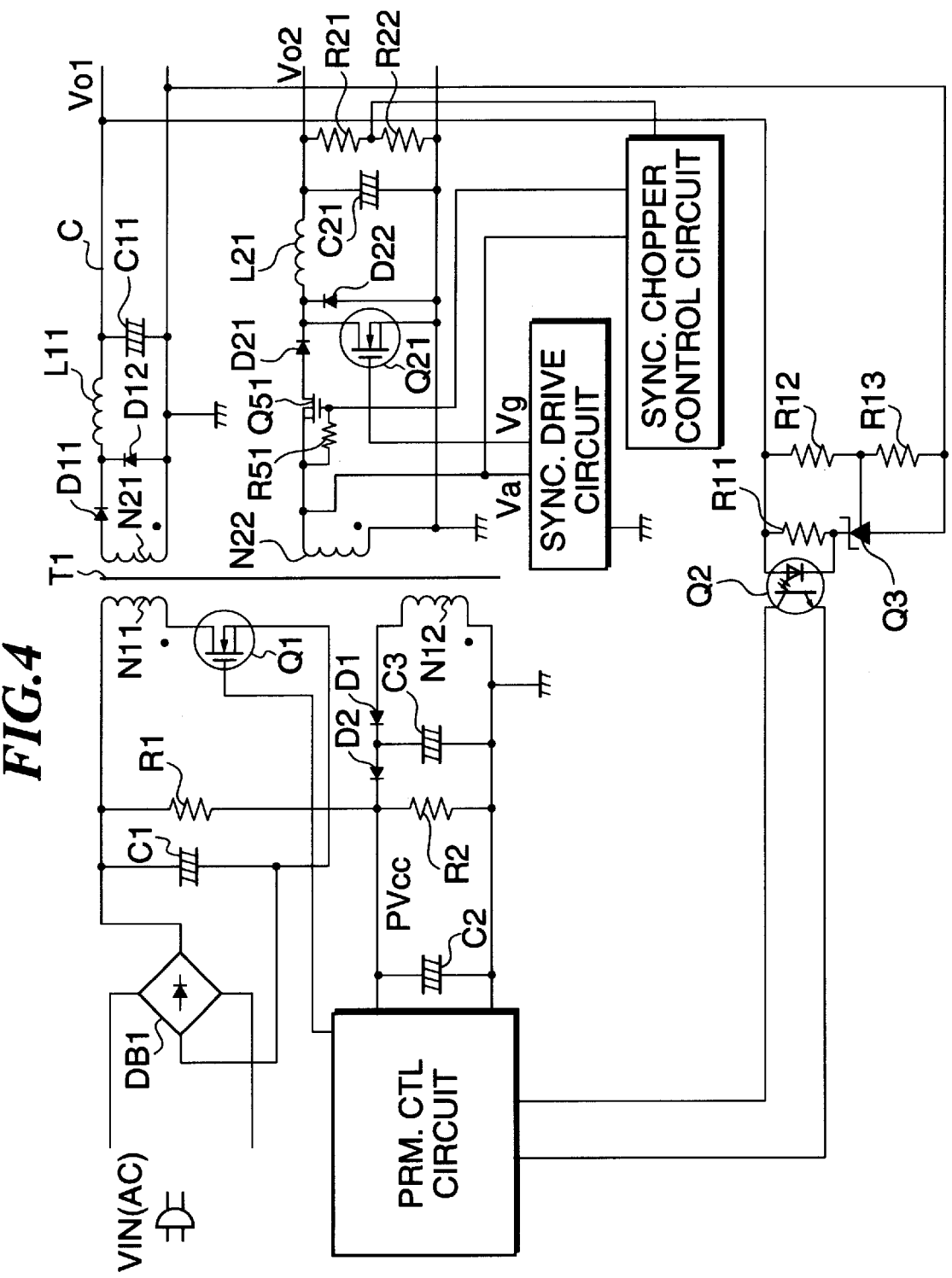
FIG. 4 is a block diagram showing the construction of a switching power circuit according to a second embodiment of the present invention.

FIG. 4 is a block diagram showing the construction of a switching power circuit according to the second embodiment. In FIG. 4, the saturable reactor L22 as the MAGAMP in FIG. 1 is replaced by a semiconductor switch. A field effect transistor Q51 is turned on/off in a proper timing according to a signal synchronized with the switching of the field effect transistor Q1, which is acquired from the secondary winding N22 of the transformer T1, and a detected voltage signal indicative of a current voltage Vo2 acquired from resistances R21, R22. Thus, the second embodiment achieves the same effect as the first embodiment by turning on/off the field effect transistors Q51, Q21 in the same timing as in the first embodiment.

As stated above, the switching power circuit according to the second embodiment, which has the voltage regulating circuit using the synchronous chopper circuit (the field effect transistor Q51: as the semiconductor switch) connected to at least one winding N22 of the secondary windings N21, N22 of the switching power supply transformer T1, is characterized by constructing the synchronous rectifier circuit by replacing the rectifier diode D22 at the flywheel side of the output of the secondary winding N22 having the synchronous chopper circuit connected thereto by the field effect transistor Q21, obtaining the primary switching signal of the switching power supply transformer T1 from the secondary winding N22, and driving the rectifying field-effect transistor Q21 (at the flywheel side) of the synchronous rectifier circuit according to the drive signal Vg acquired by inverting the switching signal.

Therefore, the present invention reduces the power loss at the secondary rectifier diode (at the flywheel side) of the switching power supply transformer T1, and can obtain the synchronous rectifier control signal by a simple structure. This reduces the size and cost of the switching power circuit.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A switching power circuit comprising:
   a transformer having a plurality of windings, one end of a primary winding of the transformer being connected to a voltage source;
   a first switching device, another end of the primary winding being connected to a return side of the voltage source through said first switching device;
   a magnetic amplifier connected to a secondary winding of said transformer;
   a forward-type rectifier circuit connected to said magnetic amplifier and including at least a flywheel diode;
   a second switching device connected in parallel with said flywheel diode; and
   a control circuit for turning on/off said second switching device in accordance with an output of said secondary winding of said transformer;
   wherein said magnetic amplifier comprises a saturable reactor, the switching power circuit further comprising a reset current control circuit for controlling a reset current for resetting said saturable reactor according to an output of said forward-type rectifier circuit.

2. A switching power circuit according to claim 1, wherein said forward-type rectifier circuit further comprises a rectifier diode, a choke coil, and a smoothing condenser.

3. A switching power circuit according to claim 1, wherein said transformer further comprises a second secondary winding, the switching power circuit further comprising a second forward-type rectifier circuit connected to said second secondary winding.

4. A switching power circuit according to claim 4, further comprising a second control circuit for turning on/off said first switching device according to an output of said second forward-type rectifier circuit.

5. A switching power circuit comprising:
   a transformer having a plurality of windings, one end of a primary winding of said transformer being connected to a voltage source;
   a first switching device, another end of the primary winding being connected to a return side of said voltage source through said first switching device;
   a semiconductor switching device connected to a secondary winding of said transformer;
   a forward-type rectifier circuit connected to said semiconductor switching device and including at least a flywheel diode;
   a second switching device connected in parallel with said flywheel diode;
   a control circuit for turning on/off said second switching device in accordance with an output of said secondary winding of said transformer and
   a synchronous chopper control circuit for turning on/off said semiconductor switching device according to an output of said forward-type rectifier circuit.

6. A switching power circuit according to claim 5, wherein said forward-type rectifier circuit further comprises a rectifier diode, a choke coil, and a smoothing condenser.

7. A switching power circuit according to claim 5, wherein said transformer further comprises a second secondary winding, the switching power circuit further comprising a second forward-type rectifier circuit connected to said second secondary winding.

8. A switching power circuit according to claim 7, further comprising a second control circuit for turning on/off said first switching device according to an output of said second forward-type rectifier circuit.

9. A switching power circuit comprising:
   a transformer having a plurality of windings, one end of a primary winding of said transformer being connected to a voltage source;
   a first switching device, another end of the primary winding being connected to a return side of said voltage source through said first switching device;
   a conducting/cutting-off circuit connected to a secondary winding of said transformer, for conducting and cutting-off an input signal;
   a forward-type rectifier circuit connected to said conducting/cutting-off circuit and including at least a flywheel diode;
   a second switching device connected in parallel with said flywheel diode;
   a first control circuit for outputting a control signal for controlling conducting or cutting-off timing of said conducting/cutting-off circuit according to an output of said forward-type rectifier circuit; and
   a second control circuit for controlling said second switching device in such a manner as to be on during a predetermined period included in a cutoff period of said conducting/cutting-off circuit in accordance with an output of said secondary winding of said transformer.

10. A switching power circuit according to claim 9, wherein said conducting/cutting-off circuit comprises a saturable reactor, and said control circuit comprises a reset current control circuit for controlling a reset current for resetting said saturable reactor.

11. A switching power circuit according to claim 9, wherein said conducting/cutting-off circuit comprises a semiconductor switching device, and said control circuit comprises a synchronous chopper control circuit for turning on/off said semiconductor switching device.

12. A switching power circuit according to claim 9, wherein said forward-type rectifier circuit further comprises a rectifier diode, a choke coil, and a smoothing condenser.

13. A switching power circuit according to claim 9, wherein said transformer further comprises a second secondary winding, the switching power circuit further comprising a second forward-type rectifier circuit connected to said second secondary winding.

14. A switching power circuit according to claim 13, further comprising a second control circuit for turning on/off said first switching device according to an output of said second forward-type rectifier circuit.

* * * * *